United States Patent [19]

Norton et al.

[11] Patent Number: 5,508,056
[45] Date of Patent: Apr. 16, 1996

[54] LOW FAT SPREAD

[75] Inventors: Ian T. Norton, Rushden Northants; Charles R. Brown, Bedford; Jeffrey Underdown, Wellingborough, all of Great Britain

[73] Assignee: Van den Bergh Foods Company, Division of Conopco, Inc., Lisle, Ill.

[21] Appl. No.: 265,286

[22] Filed: Jun. 24, 1994

[30] Foreign Application Priority Data

Jul. 1, 1993 [EP] European Pat. Off. .............. 93305155

[51] Int. Cl.$^6$ ..................................................... A23D 7/00
[52] U.S. Cl. ........................... 426/602; 426/603; 426/576
[58] Field of Search .................................. 426/603, 602, 426/576

[56] References Cited

U.S. PATENT DOCUMENTS

| | | | |
|---|---|---|---|
| 4,943,445 | 7/1990 | Norton | 426/602 |
| 4,956,193 | 9/1990 | Cain | 426/576 |
| 5,151,290 | 9/1992 | Norton | 426/576 |
| 5,194,285 | 5/1993 | Norton | 426/573 |
| 5,217,742 | 6/1993 | Jones | 426/602 |
| 5,244,688 | 9/1993 | Norton | 426/602 |
| 5,306,517 | 4/1994 | Norton | 426/602 |

FOREIGN PATENT DOCUMENTS

| | | |
|---|---|---|
| 298561 | 1/1989 | European Pat. Off. . |
| 355908 | 2/1990 | European Pat. Off. . |
| 0387940 | 9/1990 | European Pat. Off. . |
| 398411 | 11/1990 | European Pat. Off. . |
| 432835 | 6/1991 | European Pat. Off. . |
| 441495 | 8/1991 | European Pat. Off. . |
| 61-205446 | 2/1987 | Japan . |
| 04278049 | 10/1992 | Japan . |
| 301939 | 7/1896 | U.S.S.R. . |

OTHER PUBLICATIONS

Low fat spread with low content of skimmed milk powder made by homogenizing water phase and emulsifying into fat phase, Derwent Publ. 91-337367, (Grinsted Prod.), RD V. 330, #059.

Low fat spread preparation, etc. with Derwent abstract, RD V. 302, #092, Jun. 10, 1989.

RD V. 301 #055 with Derwent abstract May 10, 1989.

*Primary Examiner*—Carolyn Paden
*Attorney, Agent, or Firm*—A. Kate Huffman

[57] ABSTRACT

A fat-continuous spread comprising:

(A) from 0.1 to 10 wt % of gelatin;
(B) from 0.1 to 7 wt % of a gelled polysaccharide not being starch;
and
(C) from 10 to 60 wt % of fat.

The balance of the above being traditional constituents of spreads.

12 Claims, No Drawings

LOW FAT SPREAD

The present invention is concerned with spread products, in particular with fatcontinuous spread products of low fat content, and processes for their preparation.

BACKGROUND OF THE INVENTION

Many attempts have been made to formulate low fat spread products. Amongst the various reasons why such products are desired is the wish to reduce the caloric content of the spread and other dietetic considerations and the wish to lower the production costs, in particular by reducing the raw material costs.

A substance that has widely been applied as a tat extender is water. This use of water has, for example, led to the introduction of so-called halvarines. If relatively high levels of water are used, often thickening agents and/or gelling agents are used for avoiding adverse effects of the high water level.

For example EP-A-298 561 (Unilever) describes the preparation of edible plastic dispersions not having a continuous fat phase, said composition including at least two gelling agents forming two gel-forming compositions.

EP-A-355 908 (Unilever) relates to thermoreversible microgels of polysaccharides being substantially less rigid than a gel of the same composition formed under quiescent conditions.

EP-A-432 835 (Unilever) relates to chemically set gels prepared under shear, said gels being substantially less rigid than the same composition prepared under quiescent conditions.

EP-A-441 495 (Pfizer) relates to an emulsion type low calorie fat substitute comprising an aqueous phase and a fat phase, wherein the interaction between the two phases results in a pourable product.

Research Disclosure volume 302, nr 092 (Anonymous) discloses low fat spreads containing 0.5–2.0% of either alginate or pectin in the water phase.

Research Disclosure Vol. 330, nr 059 (Grindsted) discloses very low fat-continuous spreads with gelatin, skimmed milk powder and alginate.

EP-A-387 940 (Unilever) discloses fat continuous spreads containing gelatin, hydrolysed starch and optionally pectin.

JP 04 278 049 (Taiyou Yushi KK) discloses spreads with gelatin, xanthan gum and 8 to 47% polysaccharide e.g. poltdextrose.

EP-A-398 411 (Unilever N.V.)describes the production of fat-continuous spreads with high levels of gelatin and low or minor amounts of a second gelling agent by pregelation followed by phase-inversion.

For enhancing the gelation rate of gelatin, often starch is added, for example in the from of hydrolysed starch. However the disadvantage of using starch is that it often gives rise to a starchy taste or grainy appearance of the product.

SUMMARY OF THE INVENTION

It is the object of the present invention to formulate low fat spread products having a good flavour, texture and which do not have a grainy appearance and which have an excellent melting behaviour in the mouth. It is also an object of the present invention to select those ingredients which results in high quality products which can be produced by a relatively simple and short production process. Thus either a shorter and cheaper production line can be used or the throughput of existing equipment can be increased. Also the products according to the present invention have no off flavour as obtained with starch.

Surprisingly it has been found that these high quality, low fat fat-continous products can be obtained without the need for long gelation times if specific gelling agents are used at specified levels.

DESCRIPTION OF THE PREFERRED EMBODIMENTS

Accordingly the present invention relates to a fat-continuous spread comprising:

(A) from 0.1 to 10 wt % of gelatin;

(B) from 0.1 to 7 wt % of a gelled polysaccharide (not being starch);

and (c) from 10 to 60 wt % of fat.

The balance of these products being traditionally used ingredients like water, salt, emulsifier, food acid, flavour, colour, and preservative.

In preferred embodiments of the present invention the amount of gelatin is from 2 to 6 wt %; the amount of gelled polysaccharidc is from 0.2 to 2 wt % and/or the amount of fat is from 14 to 45 wt %.

Although applicants do not wish to be bound by any theory it is believed that the good quality of the product is caused by the fact that the gelling polysaccharide quickly forms a gel, providing an initial structure to the product, in the form of discrete gelled polysaccharide particles which are dispersed in the gelatin matrix which is gelled afterwards. Hence a preferred embodiment of the invention would be a fat-continuous product of the above composition, wherein the aqueous phase consists of gelled droplets, each droplet comprising polysaccharide particles dispersed in a gelatin matrix.

It has also been found that the flavour and salt release of the product can markedly be improved if the aqueous phase consists of aqueous droplets having a volume weighted diameter of at least 5 μm, but below 100 μm, more preferred from 10 to 80 μm, most preferred 15 to 50 μm. This is, however, also to some extent dependent on the fat content of the spread.

The levels of ingredients as specified above provide the good quality of the spread and allow the production of the product without the need for long gelation times.

Compositions of the invention comprise as the first gelling agent from 0.1 to 10 wt % of gelatin, more preferred from 0.5 to 8 wt %, most preferred from 2 to 7 wt %. Any commercially available gelatin capable of gelling may be used, although it is preferred to have a gelatin having a bloom strength between 100 and 300, such as 120, 150 and 250. Especially preferred is the use of gelatin having a bloom strength or about 200–300, more preferably of about 250–270 μm.

In addition to the gelatin, compositions of the invention comprise frown 0.1 to 7 wt % of a gelled polysaccharide not being a starch, more preferred 0.5 to 4 wt %, most preferred 0.7 to 2 wt %.

Any polysaccharide capable of forming a (weak) gel may be used. The gel may either be a thermoreversible gel or a chemically set gel. Suitable gelling polysaccharides for forming a thermoreversible gel are for example agar, alginate, pectin or a mixture thereof. Most preferably the gelling polysaccharide is pectin, especially a pectine which gels in the presence of alkaline earth ions more in particular calcium ion. The term pectin as used herein also includes esterified pectins with 5–50% of the hydroxyl groups esterified, furthermore amidated and methoxylated pectins Although less preferred, optionally compositions of the invention may comprise in addition to the above mentioned gelatin and gelling polysaccarides minor amounts of other gelling or thickening agents. Examples of such materials are gellan, denatured whey protein, denatured bovine serum protein, egg white, denatured vegetable storage protein and microcrystalline cellulose. Preferably, however, the total level of these gelling and/or thickening ingredients other than gelatin and the above mentioned gelled polysaccharide is from 0–5 wt %, most preferred 0–0.5 wt %. For taste reasons, however, in an especially preferred embodiment of the invention, the spread is substantially free from these ingredients. Also for taste reasons, preferred compositions according to the invention are substantially free from native or modified starch and contain 0 to 2 wt %, more preferably less than 0.5 wt % starch.

Compositions of the invention comprise from 10 to 60 wt % of fat, more preferred the level of fat is more than 15 wt % and less than 45%, especially 15–38 wt %.

Throughout this specification the terms oil and fat are used interchangeably. They are meant to include triglycerides of natural or synthetic origin such as soya bean oil, sunflower oil, palm oil, fish oil, rapeseed oil, coconut oil, and hydrogenated, fractionated and/or interesterified triglyceride mixtures as well as edible substances that are physically similar to triglycerides such as waxes, e.g. jojoba oil and poly fatty acid esters of mono- or di-saccharides, and that can be used as replacement for, or in admixture with triglycerides.

Preferably spreads of the invention are plastic in the sense that they can be spread onto bread without tearing the bread. Generally plastic spreads will have a stress strain relation with a maximum stress occurring at strain of 0.001–0.5, more preferred 0.01 to 0.3, the maximum stress at this strain being 0.01–100 kPa, more preferred 0.01 to 60 kPa and with a ratio of plastic stress and the maximum stress of 0.1 to 1. A suitable method for determining these values is given in EP 298 561.

In addition to the above mentioned ingredients, spreads of the invention may comprise a number of optional ingredients such as flavorings, salt, preservatives, acidifiers, vitamins, colouring materials etc.

Preferably the level of salt (sodium chloride) is from 0–4 wt %, more preferred 0.1 to 3 wt %, most preferred 0.2 to 2 wt %. Preservatives are preferably incorporated at a level of 0–4 wt %, more preferred 0.01 to 2 wt %, most preferred 0.05 to 0.15 wt %. Especially preferred is the use of potassium sorbate. A preferred colouring material is B-carotene; preferred levels of colouring material are frown 0–1 wt %, more preferred 0.01 to 0.2 wt %. Acidifiers may be incorporated to bring the pH of the product to the desired level, preferably the pH of the product is from 3 to 10, more preferred 3.5 to 7. A suitable pH-adjuster is for example lactic acid, citric acid or sodium bicarbonate.

Another optional ingredient which may be present in compositions of the invention are proteins. Preferably the protein level (including gelatin) in spreads of the invention is from 0.5 to 15 wt %, more preferred, 2 to 6 wt %, most preferred 2.5 to 4%. In an especially preferred embodiment of the invention the proteins are partially obtained from dairy sources. In another preferred embodiment of the invention the level of proteins other than gelatin is low, for example less than 1 wt %, more preferred less than 0.5 wt %, most preferred 0–0.1 wt %. In another preferred embodiment of the invention the protein is partially a vegetable protein, especially soy bean protein. For example if mixtures of these ingredients are used suitable weight ratios of animal protein to vegetable protein may for example be from 10:1 to 1:10.

The spread may further contain small particles such as herbs and vegetables. The total level thereof will generally be less than 10 wt %.

Spreads of the invention will generally comprise fairly high levels of water, say from 30 to 88 wt % of the composition, more preferred 40 to 80 wt %, most preferred 50 to 70 wt %. Water may be incorporated as such, or as part of the other ingredients such as milk etc. Spreads of the invention are fat-continuous in the sense that they comprise a continuous fat phase. Fat-continuous spreads can readily be distinguished from water-continuous spreads by virtue of conductivity measurements.

Spreads of the invention can suitably be used as bread spreads to replace e.g. margarine or halvarine, but they can also suitable be used as flavoured spread, for example cheese spreads, meat spreads, nut spreads, sweet spreads or vegetable spreads.

Spreads of the invention may be prepared by any suitable method for the preparation of fat-continuous spread products. A preferred method however involves the mixing of the ingredients, optionally followed by pasteurisation followed by cooling in one or more scraped surface heat exchangers (A-units) to a temperature of 0° to 10° C., optionally followed by processing through one or more C-units. Pasteurisation is especially preferred for extending the keepability of the product. Generally, the initial mixture is water continuous, during cooling this will be inverted (generally under shear) to a fat-continuous product. Preferably, at least the polysaccharide part of the aqueous phase is gelled prior to phase-inversion to a fat-continuous product. After preparation the spreads are generally packed in wrappers or containers, generally tubs with a content of 2–1000 g will be used, especially 5, 10, 15,250 or 500 g. Preferably the packed product is stored at refrigerator temperatures.

EXPERIMENT

An aqueous phase was prepared by mixing 5 wt % gelatin, varying levels of pectin and sufficient $CaCl_2.H_2O$ to gel the pectin in water of 85° C. The samples were cooled to 5° C. and the time was measured starting at the beginning of cooling until a gel began to form.

For 5% gelatin in the absence of gelling polysaccharides the onset of gel-formation was about 130 s after cooling began. For 5% gelatin, 0.5% pectin and the ratio of divalent metal ions and caboxylic acid groups in the pectin (R)=0.5 on the ratio R=0.5 (wherein $R=2[M^{2+}]/[COO^-]$) this occurred after about 60 s, with 0.8% pectin and R=0.5 gel-formation started around 40 s, for 1% pectin and R=0.5 gel formation started at 0 s. Also 0 s was the time for 1% pectin and R=1.M represents a divalent metal, preferably calcium or magnesium.

These results clearly show that the gelation time may markedly be improved for gelatin systems containing a gelling polysaccharide.

The invention is now illustrated by the following non-limiting examples in which all percentages and parts are taken by weight unless otherwise indicated.

EXAMPLE I

The following formulation was made:

|  | wt % |
|---|---|
| Pectin (DE 35 CPFX 2918 ex Hercules)* | 0.8 |
| Calcium chloride dihydrate (R = 0.5) | 0.09 |
| Gelatin (250 bloom) | 4.0 |
| Sodium chloride | 1.2 |
| Potassium sorbate | 0.08 |
| Fat (**) | 17.8 |
| Soya bean oil 63. | 1.98. |
| Emulsifier (Hymono 4404) | 0.3 |
| β-Carotene (6%) | 0.01 |
| Flavour | |
| Water | balance |
| pH 4.0–4.5(sodium bicarbonate) | 5.0 |

*calcium sensitive and having a degree of esterification of 35%
** = 50 wt % soya bean oil, 13 wt % coconut oil, 17 wt % soya bean oil hardened to a slip melting point of 41° C., 20 wt % of an interesterified blend of 33 wt % coconut- and 67 wt % soya bean oil hardened to a slip melting point of 41° C.

The ingredients were pre-mixed at 65° C., passed through 3 A-units (jacket temperatures −5°, −5°, 0° C., speed 500, 500, 650 rpm), a C. unit (jacket temperatures −5°, −5°, 0° C., speed 500, 500, 650 rpm), a C unit (jacket temperature 15° C., speed 1000 rpm) and a C* (invertor unit, jacket temperature 20° C., speed 1000 rpm). The throughput was 30 g/min. The final exit temperature 24° C. The volume weighted aqueous phase droplet diameter ($D_{3,3}$) was 55 μm and a σ=4.5. $D_{3,3}$ was determined according to J. Coll. and Interface Sc. Vol. 40, No 2,206–218 (1972) and ibid Vol. 93, No 2,521–529 (1983). This product (in accordance to the invention) was a good-tasting fat-continuous product. As a comparison the same formulation was prepared without pectin. This comparative product, however did not form a fat-continuous system.

EXAMPLE II

According to the procedure of Example I a formulation was prepared using a similar formulation, however, 1.0 wt % of DE 35 pectin and 0.14 wt % of calcium chloride dihydrate (R=0.8)and adjusting the pH to 5.0 using sodium bicarbonate. A good-tasting fat-continuous spread was obtained with a volume weighted aqueous phase droplet diameter ($D_{3,3}$) of 55 μm and a σ=0.5.

EXAMPLE III

According to the procedure of Example I a formulation was prepared using a similar formulation, also using 0.8 wt % of DE 35 pectin but 0.18 wt % of calcium chloride dihydrate (R=1.0)and adjusting the pH to 5.0 using sodium bicarbonate. A good-tasting fat-continuous spread was obtained with a volume weighted aqueous phase droplet diameter ($D_{3,3}$) of 90 μm and a σ=0.4.

EXAMPLE IV

The following formulation was made:

|  | wt % |
|---|---|
| Pectin (see example I) | 0.76 |
| Gelatin (250 bloom) | 3.80 |
| NaCl | 1.50 |
| Potassium sorbate | 0.15 |
| Calcium chloride dihydrate | 0.09 |
| Fat (see example I) | 21.28 |
| Soya bean oil | 2.19 |
| Emulsifier (Hymono 4404) | 0.36 |
| β-Carotene (6%) | 0.07 |
| Flavour | 0.10 |
| Water | balance |
| pH (sodium bicarbonate) | 5.0 |

The ingredients were premixed at 60° C. followed by pasteurization at 85° C. The mixed was cooled in a cooling coil to 30° C. and subsequently passed through 2 A-units (end temperatures 10° C. and 5° C., speed 600 rpm) and 2 C-units (exit temperatures 10° C. and 21° C. speed 300 rpm and 1200 rpm). The throughput was 60 kg/hr.

The resulting product was a good-tasting fat-continuous product. The $D_{3,3}$ particle size of the aqueous phase droplets was 38 74!μm, σ=0.5. Microscopy revealed that the aqueous phase droplets consisted of a continuous gelled gelatin matrix wherein gelled pectin droplets were dispersed.

EXAMPLE V

| Formulation | |
|---|---|
| Fat phase | |
| Fat Blend* | 24.573 |
| Dimodan OT | 0.375 |
| β-Carotene (30% concentration) | 0.0009 |
| Lecithin | 0.05 |
| Flavour | 0.001 |
| Aqueous phase | |
| DE35 Pectin | 0.375 |
| Calcium chloride dihydrate | 0.042 |
| Gelatin (250 Bloom) | 3.75 |
| Sodium chloride | 1.50 |
| Potassium sorbate | 0.15 |
| Water | 69.183 |

*Fat blend used = 56% soya bean oil, 20% coconut oil, 11% soya bean oil hardened to a slip melting point of 41° C., 13% of an interesterified blend of 33 wt % coconut and 67% hardened soya bean oil with a slip melting point of 41° C.

The ingredients were premixed at 60° C. followed by pasteurisation at 85° C. The mixture was cooled in a cooling coil to 17° C. and subsequently passed through two scraped surface heat exchangers (exit temperatures 19° C. and 10° C. and speed 400 rpm) and three pinned stirrers (exit temperatures 13° C., 14° C. and 21° C. speeds 250 rpm, 1100 rpm and 80 rpm) and finally cooled to 12.5° C. in a third scraped surface heat exchanger operating at 350 rpm. The throughput was 60kg/hr. The product obtained was an excellent tasting spread with a volume weighted aqueous phase droplet diameter ($D_{3,3}$) of 24 μm and a σ=0.9.

EXAMPLE VI

| Formulation | |
|---|---|
| Fat phase | |
| Fat Blend | 24.573 |
| Dimodan OT Monoglycerede ex Grindsted | 0.375 |
| β-Carotene (30% concentration) | 0.0009 |

-continued

| Formulation | |
|---|---|
| Lecithin | 0.05 |
| Flavour | 0.001 |
| Aqueous phase | |
| Amidated Pectin (LM 104-AS)* | 0.375 |
| Calcium chloride dihydrate | 0.042 |
| Gelatin (250 Bloom) | 3.75 |
| Sodium chloride | 1.50 |
| Potassium sorbate | 0.15 |
| Water | 69.183 |

*Amidated pectin (Genu pectin LM 104-AS) supplied by Hercules Ltd. All further other details exactly as for Example VI. The product obtained was a good tasting spread with a volume weighted aqueous phase droplet diameter ($D_{3,3}$) of 29 μm and a σ = 1.0.

| Formulation | |
|---|---|
| Fat phase | |
| Fat Blend | 24.573 |
| Dimodan OT | 0.375 |
| β-Carotene (30% concentration) | 0.0009 |
| Lecithin | 0.05 |
| Flavour | 0.001 |
| Aqueous phase | |
| Amidated pectin (LM 104-AS) | 0.375 |
| Calcium chloride dihydrate | 0.042 |
| Gelatin (250 Bloom) | 3.75 |
| Sodium chloride | 1.50 |
| Potassium sorbate | 0.15 |
| Skimmed milk powder | 0.5 |
| Water | 68.683 |

All other details exactly as for Example VI.

The product obtained was a spread with excellent properties and showed a volume weighted aqueous phase droplet diameter ($D_{3,3}$) of 42 μm and a σ=0.9.

We claim:

1. A fat-continuous spread comprising:
   (A) from 0.1 to 10 wt % of gelatin;
   (B) from 0.1 to 7 wt % of a gelled polysaccharide not being starch; and
   (C) from 10 to 60 wt % of fat.

2. A fat-continuous spread according to claim 1 containing an aqueous phase consisting of droplets having a volume weighted diameter of more than 5 μm but less than 1001 μm.

3. A fat continuous spread according to claim 1 wherein the gelled polysaccharide is selected from agar, alginate, pectin and mixtures thereof.

4. A fat-continuous spread according to claim 3, wherein the gelling polysaccharide is pectin.

5. A fat-continuous spread according to claim 4, wherein the pectin is a calcium sensitive pectin.

6. A fat continuous spread according to claim 5 wherein the ratio of ions in the pectin is measured by a ratio $R=2[M^{2+}]/[COO^-]$ and R has a value between 0.3 and 1.5.

7. A fat-continuous spread according to claim 1 wherein the level of pectin is 0.2–2 wt % calculated on the aqueous phase.

8. A fat-continuous spread according to claim 1 wherein the fat level is 15–38 wt %.

9. A fat continuous spread according claim 1 wherein the spread contains protein not being gelatin.

10. A fat continuous spread according to claim 6 wherein R is between 0.4 and 1.

11. A process for the production of a fat continuous spread comprising the steps of:
    a) selecting from 0.1 to 10 wt. % of gelatin, from 0.1 to 7 wt. % of a gelled polysaccharide, the gel polysaccharide not being a starch, and from 10 to 60 wt. % of a fat;
    b) mixing the ingredients selected in step (a) together to form a mixture;
    c) optionally pasteurizing the mixture;
    d) cooling the mixture to a temperature of 0 to 10° C. to form a fat continuous spread.

12. A process according to claim 11 wherein the mixing step (b) further comprises gelling the polysaccharide prior to phase inverting the mixture to a fat continuous spread.

* * * * *